United States Patent [19]
Mayo

[11] 3,769,762
[45] Nov. 6, 1973

[54] METHOD FOR CONTROLLED LAPPING OF OPTICAL SURFACES TO CORRECT DEVIATIONS FROM DESIRED CONTOURS

[75] Inventor: Marvin J. Mayo, Van Nuys, Calif.

[73] Assignee: Altair Scientifics, Inc., Los Angeles, Calif.

[22] Filed: Mar. 7, 1972

[21] Appl. No.: 232,406

Related U.S. Application Data

[62] Division of Ser. No. 114,114, Feb. 10, 1971.

[52] U.S. Cl. ................................................. 51/284
[51] Int. Cl. ............................................. B24b 1/00
[58] Field of Search .................... 51/37, 121, 124 L, 51/284

[56] References Cited
UNITED STATES PATENTS

| | | | |
|---|---|---|---|
| 3,670,460 | 6/1972 | Oldfield | 51/124 L |
| 3,564,776 | 2/1971 | Aspden | 51/284 |
| 2,310,925 | 2/1943 | Bardwell | 51/124 L |
| 2,319,922 | 5/1943 | Duckwall | 51/124 L |
| 3,156,073 | 11/1964 | Strasbaugh | 51/57 |
| 1,973,527 | 9/1934 | Santo | 51/121 |
| 1,089,456 | 3/1914 | Beam | 51/57 |
| 3,427,751 | 2/1969 | Lawman | 51/57 |

*Primary Examiner*—Harold D. Whitehead
*Attorney*—Marvin E. Jacobs

[57] ABSTRACT

Apparatus for scanning an aspheric optical surface in a spiral pattern and lapping with short strokes is provided by rotating a table supporting the workpiece at a controlled rate, radially moving an arm carriage, and cyclically driving the arm on the carriage with a crank to produce short lapping strokes along the spiral scanning path. A program prepared from contour deviation plots along several diameters of the workpiece (made by knife-edge measurement techniques) control the rate of rotation of the workpiece inversely proportional to deviations from the desired surface contour. After repeated use of one program has reduced deviations by at least half, measurements are again made and a new program is prepared. Each iteration of a given program is run at a rate which assures completion of the entire program in an interval of time during which the rate of material removal will not vary by more than 10 percent.

4 Claims, 7 Drawing Figures

METHOD FOR CONTROLLED LAPPING OF OPTICAL SURFACES TO CORRECT DEVIATIONS FROM DESIRED CONTOURS

BACKGROUND OF THE INVENTION

This is a division of application Ser. No. 114,114, filed 2-10-71.

This invention relates to polishing optical surfaces, and more particularly to a method and apparatus for accurate figuring of aspheric optical surfaces by polishing.

The techniques of accurate figuring of optical surfaces, other than flat or spherical, has been traditionally regarded as a skill of high order, capable of being acquired only by a select few who possess the necessary and appropriate temperament. This is so because the lapping operation used to grind an optical surface is affected by many variables, such as: the size of lapping pad; the size and direction of the lapping stroke; the stroke rate; the composition, hardness, thickness, and backing of the pitch on the lapping pad; the composition, dryness, and drying rate of the lapping compound; the pressure on the lapping pad; curvature and change of curvature of the surface; contact area variation; and temperature of contacting areas. Since many of these are continuously varying with time, it is extremely difficult to estimate the rate at which material is being removed at any given time, and to control precisely the removal region.

Imperfections or deviations from a desired contour of a polished optical surface have, in the past, been removed by manual control or application of localized lapping strokes. For example, a high spot is customarily removed by localized manual lapping. However, the pitch of the lapping pad is somewhat resilient so that while stroking the high spot the lapping pad will conform somewhat to the shape of the high spot. The result is often removal of too much material immediately around the high spot, leaving a depression around the area which was formerly high.

Although lapping characteristics are continuously changing, there does exist a substantial finite interval during which they may be regarded constant, i.e. during which they are within such a range that they will not change the rate of material removal by more than about 10 percent. A typical interval is of the order of one minute. Therefore, if a lapping program covering equally all portions of the surface is completed in less than 1 minute, keeping such controllable parameters constant as stroke size, rate and pressure, the final contour of the surface should conform to the starting contour to within 10 percent.

SUMMARY OF THE INVENTION

A principal object of the present invention is to provide a novel controlled method for grinding desired contours on optical surfaces.

Another object is to provide an improved method for final polishing of optical surfaces to a uniform accuracy in contour of at least 5 microinches.

These and other objects of the invention are achieved by determining a time interval during which, for current operating conditions, the rate of material removal from the optical surface of a workpiece does not vary more than about 10 percent, determining the deviation of that surface from a desired contour, preparing a lapping program covering the entire optical surface within a period equal to that interval such that for a given point the grinding accomplished is proportional to the deviation of the optical surfaces from the desired contour, and repeating the program until a significant and measurable amount of material is removed from all points of the optical surface. The entire process is repeated until the optical surface is polished to a desired uniform accuracy in contour to an accuracy of at least 5 microinches, each time changing the lapping program to conform to the new contour which deviates from the desired contour. Iteration of this process will eventually bring the optical surface into coincidence with the desired contour to specified tolerances of 5 microinches or better.

In order that a given lapping program may be carried out, and repeated as necessary, with accuracy and consistency, a novel program-controlled apparatus is provided for lapping an optical surface comprising a means for holding a workpiece on which an optical surface is to be polished, and means for rotationally driving the holding means about the center of symmetry of the workpiece at an angular rate proportional to a control signal. The apparatus is further comprised of means for holding a lapping pad on the optical surface of the workpiece with a controlled pressure, means for cyclically driving the pad holding means to produce consistent and repeated lapping strokes on the workpiece, and means for moving the pad holding means radially across the rotating workpiece from a point slightly off center to a point approximately on or near the periphery of the workpiece. Means for producing the control signal applied to the driving means for the rotational holding means completes the combination, where the control signal generating means includes means for varying the control signal linearly as the pad holding means is moved radially to maintain surface speed of the pad over the workpiece substantially constant.

The apparatus further includes means for producing a programming signal for the entire optical surface of the workpiece such that for each successive position of the lapping pad about which lapping strokes are produced, the programming signal amplitude is proportional to the deviation in height from the desired contour, and means responsive to the programmed control signal for controlling the work done by the lapping pad at a given point of the workpiece to be proportional to the deviation of that point from the desired contour. In a preferred embodiment, the last named means is simply means for superimposing the programming signal on the control signal to vary the rate at which the workpiece is otherwise rotated, but it should be understood that the programming signal may be used to vary the stroke rate instead or to vary the pad pressure as a function of the deviation from the desired contour.

The novel features that are considered characteristic of this invention are set forth with particularity in the appended claims. The invention will best be understood from the following description when read in connection with the accompanying drawings.

DESCRIPTION OF THE PREFERRED EMBODIMENTS

The method of the present invention for polishing optical surfaces, particularly aspheric surfaces, consists of two parts. The first part comprises generally the steps of establishing a time interval during which the rate of material removal can be expected to remain constant within 10 percent for current operating conditions, measuring the deviation of all points of the surface from a desired contour, and preparing a lap stroking program covering the entire optical surface in a period of time equal to or less than the established time interval such that the total time during which the lapping pad is in contact with each point is proportional to the deviation in height of the point from the desired contour. The second part consists of repeatedly lapping the entire optical surface according to the prepared program until a significant and measurable amount of material is removed. The entire process is then repeated until the aspheric optical surface is polished to a desired uniform accuracy, which is expected to be to within 5 microinches 0.000005 inch).

Establishing the time interval is generally done empirically, if it is not already known from experience, since the controlling parameters can be expected to be made approximately the same for each interval. A log of parameter setups and material removal rates is to be accumulated and maintained over a preliminary period of use of the machine and system.

The next step, a most important one, is measuring the deviations of each point of the optical surface from the desired contour. A technique which may be used is based on the well-known Foucault knife-edge test. This is most effective when used on concave spherical mirrors which have a property of forming a perfect image point at the center of curvature, if an illuminated pinhole object is placed at the same center of curvature. In practice, the technique is just as effective if the pinhole is slightly displaced laterally from the center of curvature so that the image point then occurs at a separate point in space, where it may be probed with a knife edge. The probing operation consists merely of moving the knife edge across the image point and observing, with the eye placed immediately behind the knife edge, the way in which the rays are cut off thereby. If the image point is perfect, as it would be from a geometrically perfect mirror, the rays from all parts of the mirror will be cut off uniformly and quite suddenly. Irregularities on mirror surface, however, will cause some rays to be directed to regions around the image point away from its precise center, thus actually enlarging the image spot (blur) above its nominal size, and the image is said to be aberrated. The knife edge will no longer cut all rays uniformly and suddenly. Instead, as it progresses into the image it will cut first those rays which are deflected in the direction toward the edge. The observer sees shadows forming on the mirror disc, which in actuality mark the location of irregularities. Proper interpretation of the shadows yields information to the optical technician which enables him to plot corrections to be made on the surface contour.

All image forming optical systems have the property of forming an image point from a pinhole object. The aberrations in the image represent a composite of contributions from all the surface. If five surfaces of a six surface system are known to be "perfect" then it may be assumed that any residual aberration in the image are due to imperfections on the sixth surface. This concept has been effectively used to extend the Foucault knife-edge test to all kinds of optical surfaces, including refractive, reflective, concave, convex, flat, conics, and even certain special aspherics. For example, if a system is built up consisting of a concave parabolic reflector and a "perfect" flat mirror facing it, then the parabola contour may be observed by means of a knife edge and pinhole source at the focal point at the parabola. Light rays traverse the system from the source pinhole to the parabola, which reflects them into a parallel (collimated) beam, to the flat mirror, which returns the rays back on themselves (retroreflection), to the parabola, and finally to the image. As with the concave spherical mirror, the pinhole and its image are physically separated by a slight lateral displacement of the pinhole away from the focus point of the parabola.

Knife-edge testing, as traditionally done, is considered to be mostly a qualitative operation, although a skilled operator is able to obtain a good deal of quantitative information by intuition. To obtain precise and reliable quantitative data, as desired for the ultimate objective of producing accurate universal optical surfaces economically, without dependence on operator skill or judgment, the following technique may be used.

Figure 1:
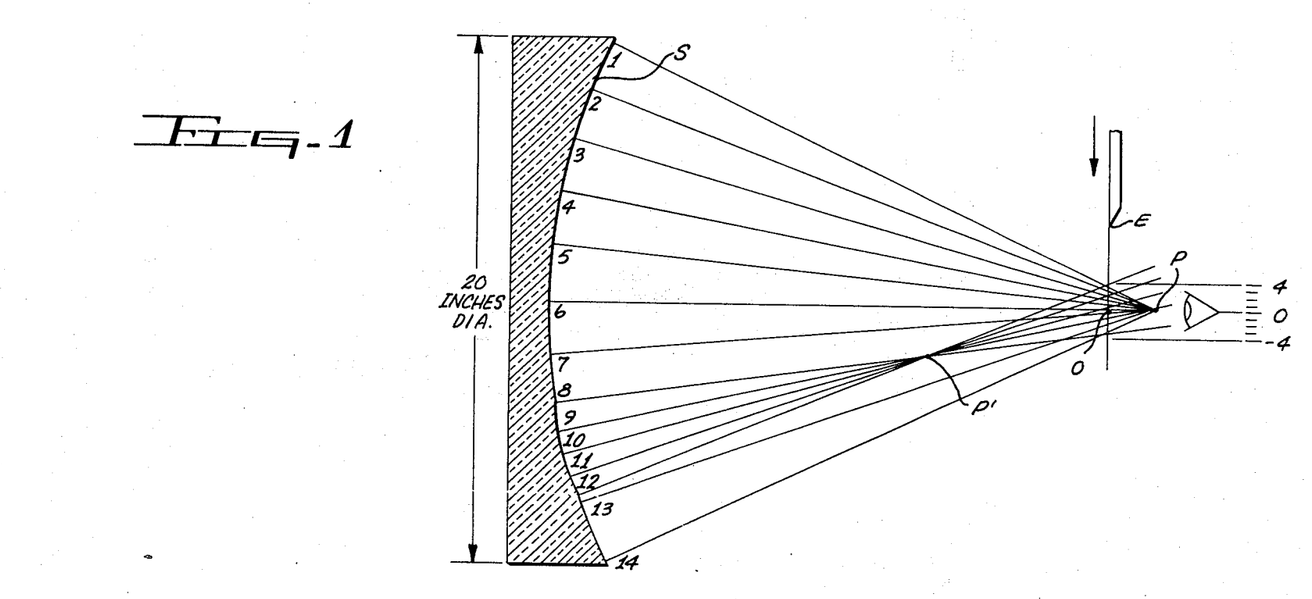
FIG. 1 illustrates in a diagram a knife-edge technique for measuring slope deviations of an optical surface from a desired contour along one diameter.

Referring to FIG. 1, consider a regular optical surface S which produces an image point at a position P, except for one anomaly (irregularity) in the lower half which produces a secondary image point at a position P' closer to the optical surface. Let the knife edge E progress across the ray bundle from one side to the other. A scale such as 1–14 is marked along the optical surface for measuring shadow edge position. This is observed directly by the eye. The knife edge is on a carriage (not shown) which is moved by a micrometer screw with a dial readout. The objective is to obtain a measurement of the amount by which each ray misses a center point O between the image point P and the optical surface. If these values are divided by the length of the respective rays, a value of "slope deviation," in radians, is obtained. That is, since in a perfect system all rays pass through the point O, the stated measurement is an indication of the angular error of each ray.

Figure 2:
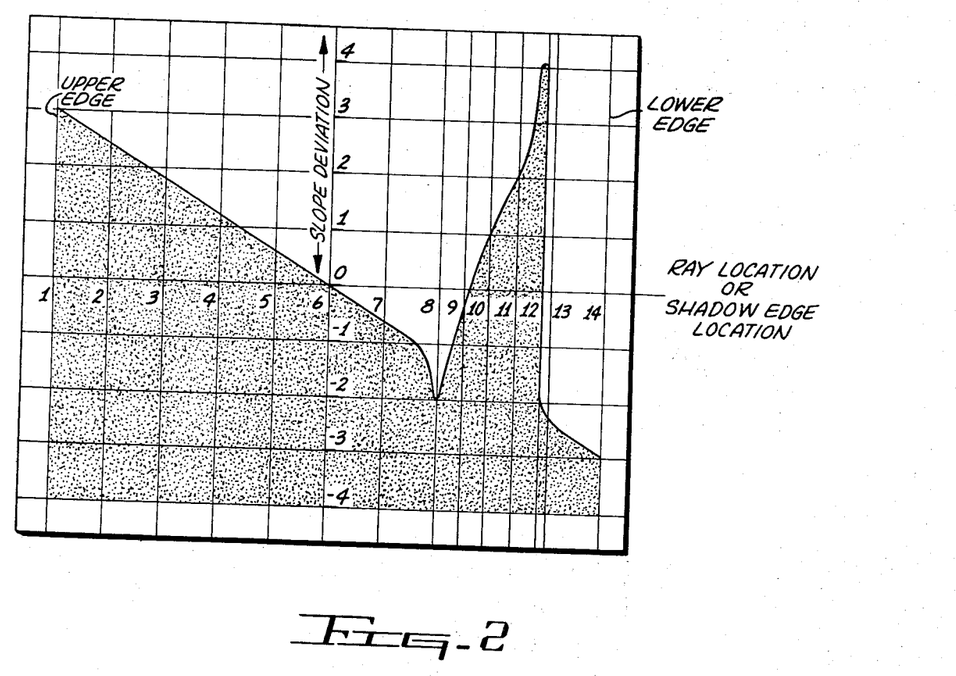
FIG. 2 illustrates a shadowgram (slope deviation curve) plotted from data obtained according to the measurements of FIG. 1.

The practical application of this technique of measurement is to make a plot of shadow edge progression as observed by the eye while the knife edge is progressively stepped along its path to complete cut off. A typical plot is shown in FIG. 2.

Starting with the knife edge at its position 4, it will be observed in FIG. 1 that ray 12 has been just intercepted. On the shadowgrams this intercept is spaced off at the level 4 line. In a typical system the 4 represents a displacement of 0.004 inches of the knife edge away from the center or zero position. As the knife edge is moved to position 3 the shadow widens toward ray 11 and this is now spaced off at level 3. Also ray 1 is just being touched. At lever 2 the space between ray 12 and 11 is completely shadowed, and at the upper edge the shadow extends almost to ray 3. Thus, these shadow edges are spaced off at level 2. Continuing down through O to level −4 the complete shadowgram is constructed and will appear as shown.

A proper scale factor needs to be assigned to the shadowgram. If the ray path length is, say, 36 inches and each level is measured as 0.001 inches then the vertical scale is: 1 = − 1/36,000 radian = 28 microradians. If the total width (diameter) of the workpiece is 20 inches, then the horizontal spacings on the shadowgram are: 1 unit = 2 inches (from 1 to 8); 1 unit = 1 inch (from 9 to 13).

The shadowgram is a plot of ray slope deviation of the normals to the given surface across one diameter. This is also the deviation of the tangents to the surface relative to the tangents to a perfect surface. Actually, if the surface is reflective, the ray angles represent twice the deviation of the normals and tangents, so that if the surface itself is to be measured all ordinate values must be divided by 2.

The slope deviation curve can be integrated and from this there will result a contour deviation curve along the one diameter. The deviation will be relative to a perfect contour which focuses all rays to the single point at O, FIG. 1.

Figure 3:
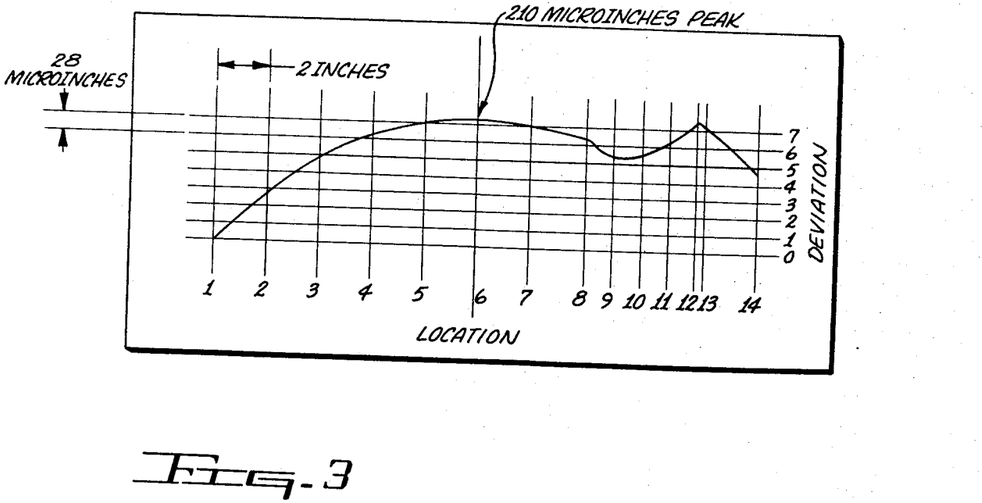
FIG. 3 illustrates a contour deviation curve obtained by integrating the slope deviation curve of FIG. 2.

The integral curve or contour deviation is shown in FIG. 3. The horizontal zero level line represents the desired perfect contour, and the ordinates represent excess material to be removed in order to bring the surface to the desired contour. A maximum of 210 microinches is shown as excess at the center. This completes the step along one diameter. The step is repeated over as many other diameters as necessary to plot a complete deviation contour map for the entire optical surface. A program is prepared from such a map, as will be presently described.

In order that the measurement may be done efficiently and reliably a special knife edge apparatus has been designed which can be easily set up and operated by persons of ordinary skills and with a minimum of instruction. The apparatus is described in a copending application Ser. No. 114,419 filed Feb. 2, 1971 and titled Optical Contour Scanner.

The figuring or grinding part of the optical surface finishing process begins with adaptation of the measured data to a lapping machine. A special machine unlike any which has been heretofore used will be required. Its principal characteristic are as follows: One section carries a rotatable work spindle to which the workpiece is attached. Another carries a lapping pad which can be brought into contact with the workpiece so that, by a scrubbing motion, the pad can remove material from the optical surface. The pad is given at least two types of scrubbing motion independently of the motion of the workpiece on its spindle, one a radial motion relative to the center of the rotating workpiece, and the other a cyclic motion superimposed on the radial motion.

In such a grinding machine, the net lapping stroke or motion is derived from these three motions, each controllable in speed from a pre-established program. Thus, in a typical arrangement, the workpiece rotates on its own axis under the lapping pad as the first motion and the lapping pad is reciprocated radially in and out, as the second such motion, while a third motion in the form of short cyclical reciprocating, rotary, figure-eight or star motion is superimposed on the radial reciprocating motion. Generally, the first two motions proceed at a slow rate to affect placement of the lapping pad on a particular point of the workpiece while the third scrubs away the material on and around that point. A basic feature of this arrangement is that the area of the lapping pad will be small relative to the area of the workpiece. By contrast, conventional lapping machines use a pad which covers the entire workpiece and the stroking action is designed to move the pad in a completely random manner. Corrections to the contour are made by localized hand scrubbing.

An important part of the lapping machine described hereinafter is a programmable speed control means by which the scrubbing action can be concentrated in particular areas of the workpiece. In a preferred embodiment, the control is as follows. The rotary and radial machine motions are set up in relation to each other such that the lap will cover the entire optical surface of the workpiece by some form of scanning action. A spiral scan starting approximately at the center of the workpiece may be considered typical but not restrictive. A polar coordinate circumferential progression of radial strokes might be another similar to that of a radar PPI display scan. A variation in the drive might also produce a rectangular coordinate (parallel line) scan similar to that of a TV raster scan. Thus the stated spiral scanning of the optical surface is not the only method of covering the optical surface with localized scrubbing or lapping. Another possibility consists of a back and forth rotation of the work spindle over a limited sector, and a progressive radial motion of the carriage. Another consists of a linear reciprocating motion of the workpiece and a crosswise progression of the carriage. The choice of scanning depends on the type of workpiece contour being processed.

A distinctive feature of the lapping machine and its drive is that it permits slowing down (or speeding up) the scanning rate over a local area of the workpiece where there exists a high spot (or a depression) on the surface. This is programmed into the machine, in accordance with the data (deviation contour map) derived from the measuring steps. The exact relationship between speed of scan and the contour deviation at any given point is according to this formula:

$$\text{Speed of Scan} = K/\text{contour deviation}$$

where $K$ is a constant. The procedure for implementing this formulation in a machine program is as follows:

1. Obtain contour deviation curves across at least four diameters of the workpiece, these diameters to be spaced at equal intervals.

2. From these, make up a new set of curves, which may be called time inversion curves, by taking each ordinate, reciprocating the same, and plotting the reciprocal against the corresponding abscissa. To obtain a usable set of data it is necessary to offset the zero or perfect curve reference from its theoretically correct location, by about 1/6 of the maximum ordinate on the contour deviation curves. This avoids dividing by zero, and means simply that all parts of the contour will be reduced, and that the net contour will be slightly below the lowest point on the currently unfinished workpiece.

3. Using the data of the equally spaced diameters, plot a map of inverse time (proportional to speed) over the area of the workpiece. This may be referred to as a deviation contour map, or more particularly an inverse deviation contour map.

4. The contour deviation plot is to be made up as a transparency wherein each contour level is given a particular level of gray scale shading. Six or more levels of shading may be used, but many of the probable surface irregularities can be adequately described in two or three levels. An analog device to be described hereinafter reads this transparency via a light beam and photoelectric device and translates the information into control signals for the work spindle drive motor. To avoid a step change of speed between contour levels, the light beam has a finite diameter (where it passes through the transparency) approximately equal to the spacing of contour lines on the disc. Thus, the contribution to the signal being generated will, at all times, be derived from not less than two gray scale levels, and the signal variation is thereby smoothed out.

Once programmed, the machine is used to apply the lapping pad to the workpiece in cycles. Each cycle covers the complete optical surface and concentrates the stroking contact time on the high spots of the surface. The only element of judgment required of the operator is in regard to the total number of program cycles through which the machine is permitted to run before repeating the entire process starting with the measuring steps. It is obvious that if the program is repeated enough times the machine will overshoot and produce depressions where there were high spots, and leave high spots where there were depressions. Ideally, the operation must be stopped when the surface is "level". To mitigate the only judgment required, however, and to insure uniform high quality production, a special procedure is recommended:

1. The lapping operation must be terminated at a point where the surface has progressed only about halfway toward the perfect condition. This permits a 100 percent error in guessing the "time on" operation.

2. The workpiece is now again measured and a new program is prepared for the machine. This gives the operator immediate basic information on the cutting rate of the lap, and also catches all anomalous cutting actions such as may be due to varying material hardness of the workpiece.

3. The lapping operation is again allowed to approach only halfway toward the goal, and a new measurement and machine program is made. This process should be repeated until all surface anomalies are within the specified tolerance. It is easy to demonstrate that a maximum of only six iterations will be required to reduce the deviations in a workpiece from 100 microinches to 3 microinches, and that additional iterations can reduce the deviations in 0.0005 microinches.

Figure 4:
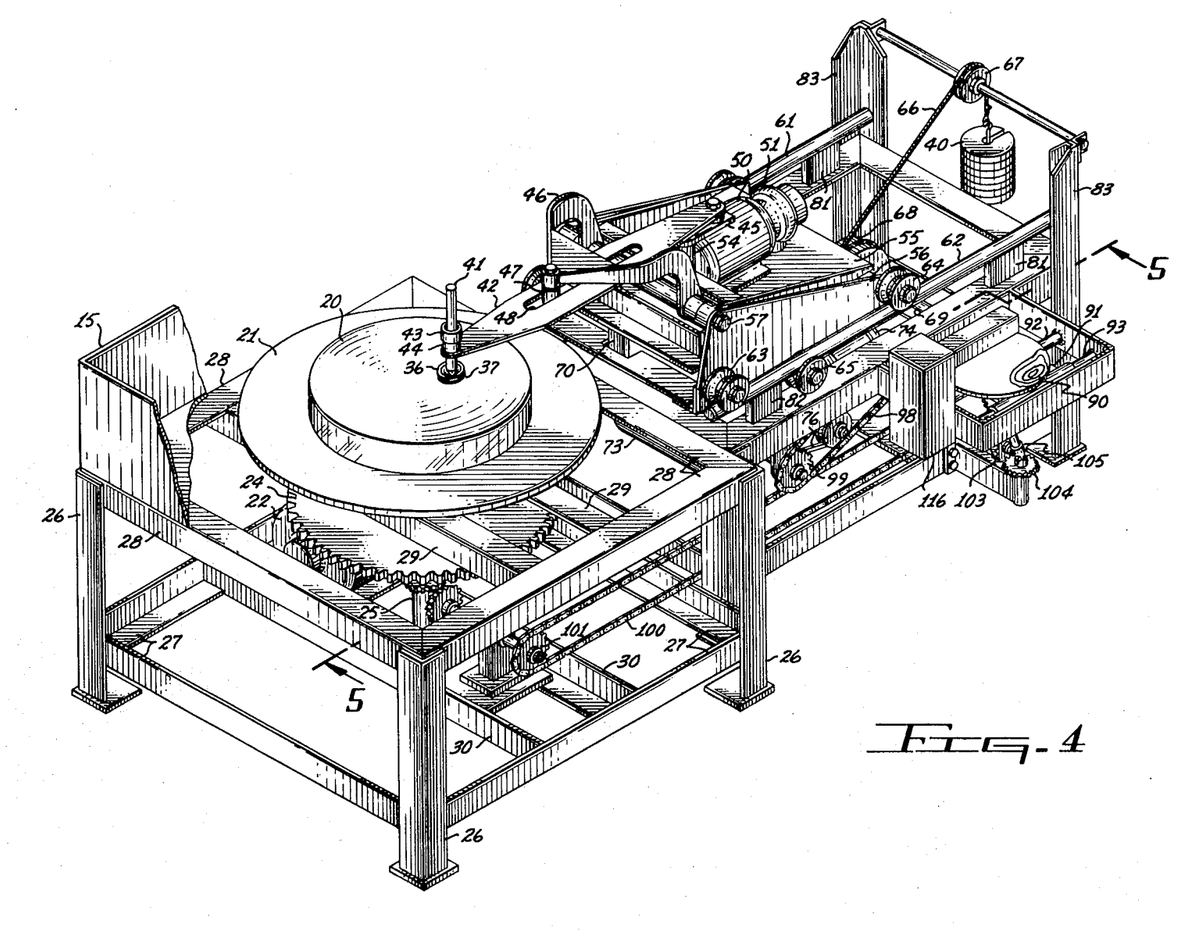
FIG. 4 is an isometric view of novel apparatus for carrying out the principles of the present invention.
Figure 5:
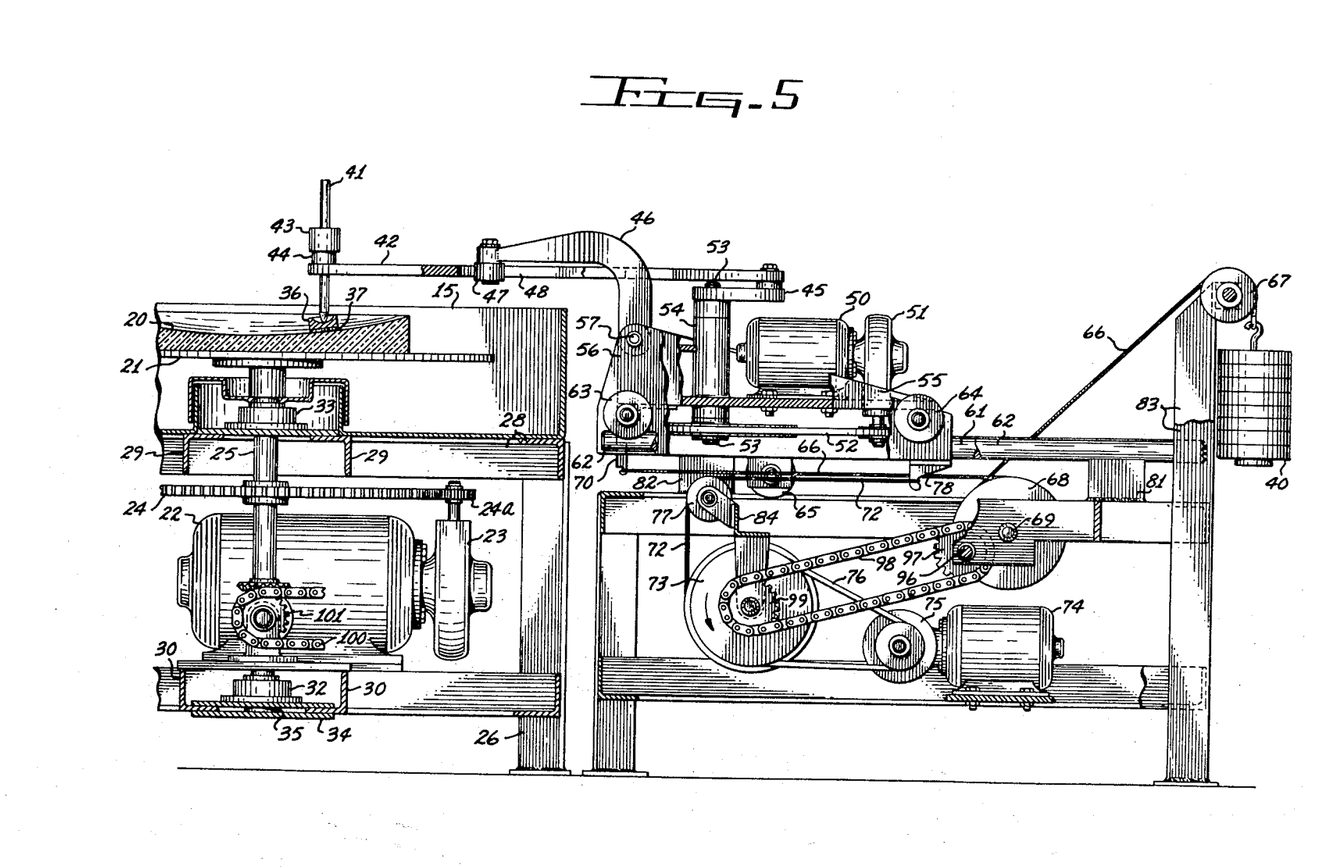
FIG. 5 is a side elevation of the apparatus of FIG. 4, partially in section along a line 5—5 in FIG. 4.

Referring now to FIGS. 4 and 5, there is disclosed a preferred embodiment of apparatus for automatically grinding or polishing optical surfaces, particularly aspheric optical surfaces, in accordance with the principles of the present invention. FIG. 4 is an isometric view with a receptacle 15 all broken away but for one corner, and FIG. 5 is a side elevation partially in section. For convenience in referring to a particular elements of the apparatus only the reference number will be called out, since the elements may be found in both figures.

The first unit of the machine which holds a workpiece 20 is comprised of a table 21 which is rotated by a variable speed drive motor 22 through a reduction gear 23, driven gear 24, a drive gear 24a, and a shaft 25. The elements 21 to 25, and the receptacle 15, are supported by a steel frame consisting of a vertical member 26 at each corner, a lower horizontal member 27 on each side and an upper horizontal member 28 on each side. Additional upper and lower cross members 29 and 30 are provided, the lower cross members serving to support a lower shaft bearing assembly 32, and the upper cross member 29 serving to support an upper bearing 33. The lower cross member 30 also supports the shaft 25 in a vertical position through a plate 34 and a shaft bearing 35. A lapping pad 36 having a layer of pitch 37 bears against the optical surface of the workpiece 20 with a constant pressure set by weights 40 in a manner to be described more fully hereinafter. The pressure is applied to the pad 36 through a pin 41 rigidly attached to an arm 42 through a sleeve 43 securely threaded onto a vertical pin support member 44 attached to the arm 42.

The arm 42 is driven to produce cyclical motion of the pad 36 on the optical surface of the workpiece 20 by a drive crank 45. A bifurcated pivot bracket 46 carries a slide member 47 in a guide slot 48 running through the center of the arm 42. In that manner, the bracket 46 serves to guide or help define the cyclical motion of the arm 42 as the drive crank 45 is rotated by a motor 50 through a reduction gear box 51, a drive belt 52 and a shaft 53 supported by a sleeve 54 secured to an inner cradle 55, as may be more clearly seen in FIG. 4.

The inner cradle 55 supports the motor 50 and gearbox 51, and is in turn carried by a carriage 56. The sole connection between the inner cradle 55 and the carriage 56 is a horizontal pin 57 passing through sidewalls of the carriage 56, sidewalls of the inner cradle 55 and the two arms of the bifurcated bracket 46. The carriage 56 includes a pair of parallel rails 61 and 62.

Three wheels on each side of the carriage 56 guide and carry the carriage on the rails. For example, wheels 63 and 64 on the near side of the carriage as shown in FIG. 4 support the near side of the carriage on the rail 62 while a third wheel 65 serves to hold the wheels 63 and 64 firmly on the rail 22. Thus, while be a arm is driven by a motor 50 (which may be variable speed motor of conventional design), the assembly consisting of the inner cradle 55, pivot bracket 46 and arm 42 mounted on the carriage 56 moves on the guide rails in a straight line. By moving the carriage 56, the lapping pin 41 carried by the arm 42 (which overhangs the workpiece 21) can be moved from the edge of the workpiece toward the center.

The pressure of the lapping pad 36 on the workpiece 20 is maintained constant regardless of the contour of the optical surface being polished by the constant force of gravity set by the weights 40 and translated to the pin 41 through the arm 42 by a cable 66. That cable passes over a pulley 67 and around a drum 68 rotatably mounted on an axle 69 mounted between upper cross members of a steel frame similar to, but larger than the frame supporting the work table 21 and the drive elements for the work table. The pulley 67 and drum 68 are supported on the frame for the rails in a position preferably between the rails. Only one turn around the drum 68 is required, that being solely for the purpose of translating the direction of the force produced by the weight 40 to a horizontal direction. The free end of the cable 66 is attached to a lever 70 to pivot the inner cradle above the pin 57 and thereby translate the force produced by the weights 40 to the pin 41 via the arm 42, the crank 45, and the shaft 53 mounted in the sleeve 54.

While a constant force is being applied to the lever 70 by the cable 66 to tilt the inner cradle 55, the carriage 56 on which the inner cradle is pivoted is being driven on the carriage rails from right to left by a cable 72 which is being wrapped around a drum 73. The drum is rotated on an axle suspended from the frame supporting the rails and carriage. An adjustable speed motor 74 drives the drum 73 through a gearbox 75 and a belt 76. The drum 73 is provided with an annular V-groove so that it also serves as a pulley for the drive belt 76. The free end of the cable 72 is passed over a pulley 77 to change its direction of force on a hook 78 from vertical to horizontal. That hook is firmly secured to the end of the carriage 56. Thus in one full operation of lapping the entire optical surface of the workpiece, the carriage 56 is pulled along the rails from an extreme right hand position to substantially the position shown while the drive crank 45 is continuously driven at a constant rate to produce cyclical motion of the lapping pad on the optical surface.

At the same time, the motor 22 is controlled to rotate the table on which the workpiece is supported in order that the optical surface of the workpiece be scanned in a spiral pattern. In other words, the linear motion of the carriage 56 and the rotary motion of the table 21 jointly produce a spiral motion of the lapping pad on the optical surface. Superimposed on that is the cyclical motion produced by the drive crank 45.

In order that the spiral scan motion produce uniform lapping on the entire surface of the workpiece, the linear scanning motion is controlled for constant surface speed of the lapping pattern along the spiral path. That could be accomplished by increasing the linear velocity of the carriage 56, i.e. by increasing the speed of the motor 74 progressively. However, it is preferred to maintain the speed of the motor constant and to increase the speed of the motor 22 progressively as the carriage 56 advances the spiral scan from the periphery of the optical surface to a position almost at the center.

It should be noted that the carriage 56 is not permitted to advance the spiral path to the center of the workpiece because infinite speed would then be required of the motor 22. By stopping the carriage 56 short of such a centering position, as by a switch not shown tripped by the carriage 56, or by a suitable mechanical stop on the carriage rails, the demand of such speed of the motor 22 is avoided. However, the center of the optical surface is nevertheless ground or polished because the stroke of the crank 45 and the finite width of the pad 36 assures overlapping at the center and therefore the removal of material substantially equal to the lapping of any other part of the optical surface, except those parts where more material is to be removed because they are too high.

To adjust the amount of lapping on a given area in accordance with the deviation of that area from the desired contour, a program is prepared in advance as described hereinbefore, to generate a signal which varies in proportion to the contour deviation plot. In other words, a contour deviation plot is used as a program for modulating the control signal to the motor 22. That control signal is normally one which increases linearly as a function of time. The program is synchronously read out to produce an analog signal which is then added to the signal normally applied to the motor 22.

Before proceeding with a description of an exemplary technique for programming a signal which varies as a function of contour deviation, it should be noted that the carriage rails are supported on a frame which is rectangular as viewed from above, the two rails being supported by vertical plates from side members of the frame such as plates 81 and 82 supporting the rail 62. The pulley 67 turns on a rod (supported between vertical beams 83) in a position approximately centered between the carriage rails so that the cable 66 will run between the rails to the drum 68 inside the supporting frame, and from the drum 68 to the lever 70 protruding downwardly from the inner cradle through a large opening in the carriage 56. The hook 78 at the rear of the carriage 56 is preferably centered, as is the pulley 77 and the carriage drive drum 73, both of which are secured to a horizontal cross beam 84. In that manner all of the mechanism thus far described is between the two parallel carriage rails which are disposed slightly inside the outer edges of the supporting frame. Accordingly, the outside of the frame supporting the carriage rails is available for attachment of the programming apparatus to be described with reference to FIGS. 5 and 6. The near side of the supporting frame, as the mechanism is viewed in FIG. 5, is selected for the programming apparatus as shown in FIG. 4.

The programming means employed in this exemplary embodiment of the invention consists of a disc of a varying transparency prepared in accordance with the deviation information obtained in the manner described with reference to FIGS. 1 to 3. For each point of zero deviation, the programmed disc is provided with minimum transparency at a corresponding point on the program disc. Corresponding points of maximum deviation are then provided with maximum transparency, and points of intermediate deviation are provided with intermediate levels of transparency so that if the corresponding points of the programmed disc are optically scanned in synchronism with the scanning of the optical surface by the lapping mechanism, a signal is produced which has an amplitude proportional to the deviation. That signal is then superimposed on the normal signal applied to the motor 22.

Figure 6:
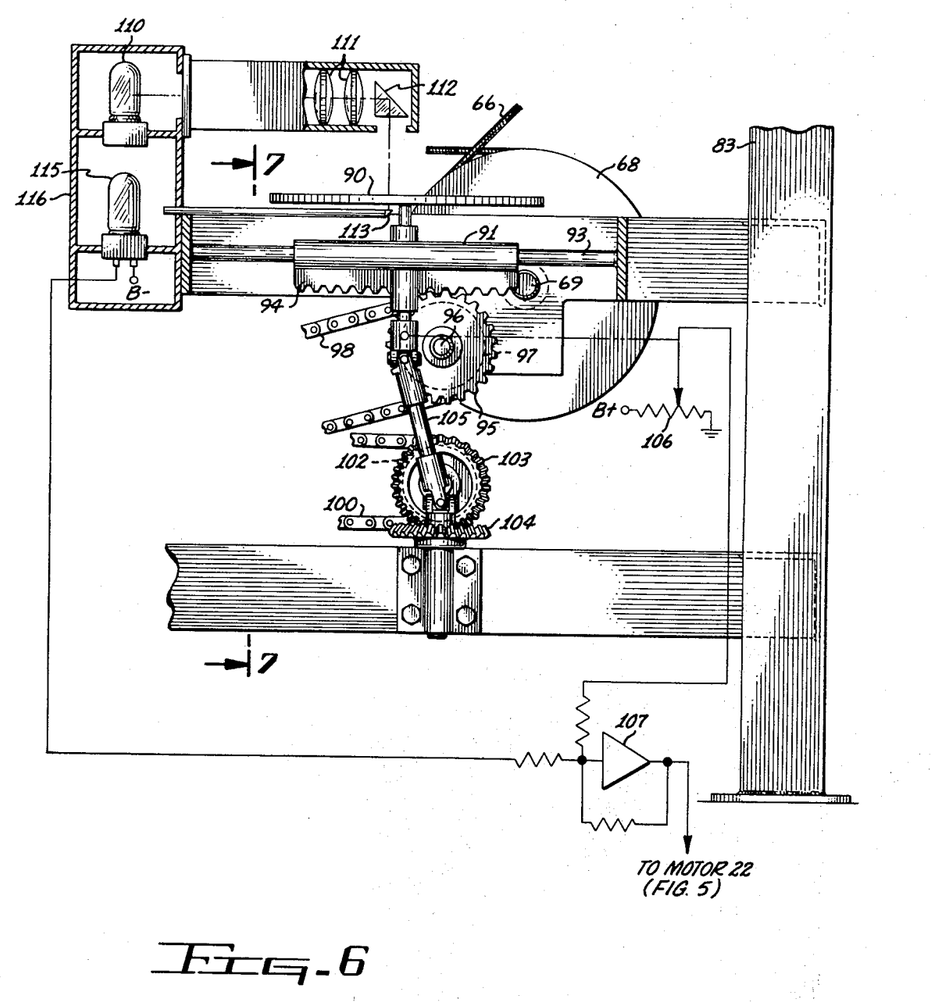
FIG. 6 is a side elevation of apparatus for programming the operation of the apparatus of FIG. 5.
Figure 7:
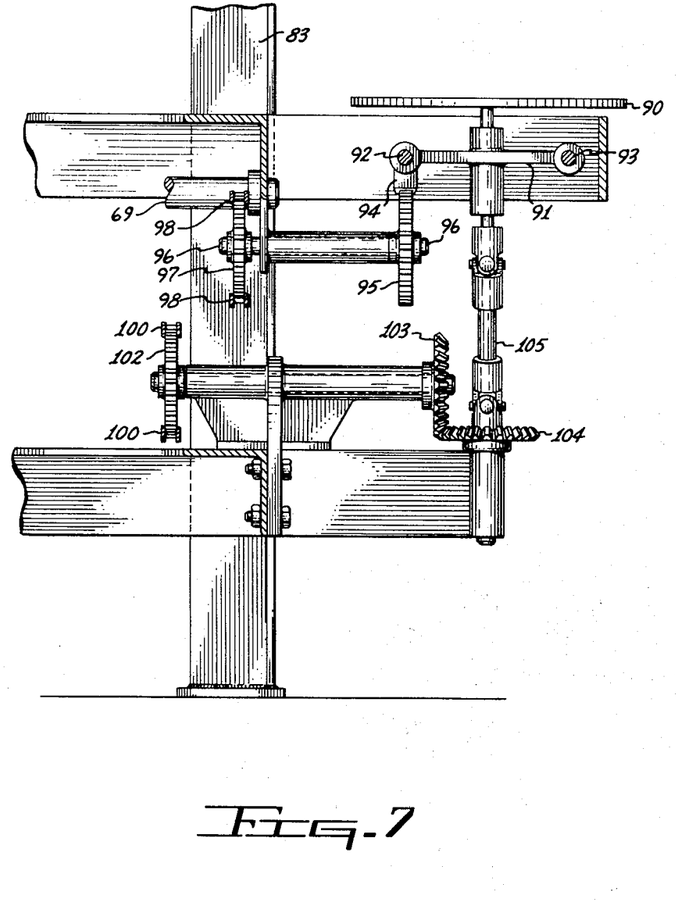
FIG. 7 is an end view, partially in section of the apparatus of FIG. 6.

Once the programming disc has been prepared, it is placed on a glass disc 90 which is rotably mounted on a carriage 91 that moves along two parallel rails 92 and 93 as shown in FIGS. 4, 6 and 7. A rack and pinion drive assembly is provided for the carriage 91 comprising a rack 94 that meshes with a pinion 95 shown in FIGS. 6 and 7. The pinion is keyed to a shaft 96 which is turned by a toothed wheel 97 driven by a chain 98. The latter is driven by a toothed wheel 99 keyed to rotate with the carriage drive drum 73 shown in FIG. 5. Assuming an equal number of teeth in both of the wheels 97 and 99, the carriage 91 will move on rails 92 and 93 a distance from one extreme position to the other in a proportion to the motion of the carriage 56 determined by the proportion of the diameter of the wheel 99 to the diameter of the drum 73. That permits operating with a programming disc of half the size of the workpiece.

As the carriage 91 moves from the right to the left, an optical system scans the programming disc starting at the periphery. Accordingly, it should be noted that the programming disc is oriented 180° from the workpiece. At the same time that the carriage 91 is driven in synchronism with the carriage 56, a second drive chain 100 shown in FIGS. 4 and 6 is driven by a toothed wheel 101 shown in FIGS. 4 and 5 to drive a toothed wheel 102 shown in FIGS. 6 and 7 keyed to a beveled gear 103 which drives a beveled gear 104 to rotate the glass disc 90 through a universal coupling 105.

The carriage 91 drives the movable contact of a potentiometer 106 through a suitable linkage indicated schematically by a dotted line. That increases the amplitude of a control voltage applied to the motor 22 via a summing amplifier 107 to increase the speed of rotation of the workpiece as the radius of the spiral scan decreases. That maintains the scanning speed on the spiral path substantially constant. At the same time, light from a lamp 110 is focused by a lens system 111 and directed by a reflecting prism 112 through the programming disc. A second reflecting prism 113 directs light transmitted through the programming disc into a light tube passing to a photomultiplier 115 in a closed and opaque enclosure 116.

The photomultiplier produces a positive signal with an amplitude proportional to the intensity of light transmitted, which is proportional to the deviation of the optical surface on the workpiece from the desired contour. That deviation signal is added to the control signal from the potentiometer 106 at the summing junction of the amplifier 107 in order to vary the amplitude of the control signal applied to the motor 22 (FIG. 4) in proportion to the deviation from the desired contour, thereby slowing down the scanning speed over high spots to increase the "lapping density." In that manner the amount of material removed from the workpiece is increased in proportion to the deviation of the optical surface from the desired contour.

A programming disc is illustrated in FIG. 4 on the glass disc 90 as a transparency having several areas of different degrees, or levels, of light transmission, the smallest area having the highest level of transmission to correspond to the highest level of a high spot on a lens being polished. The positive signal from the photomultiplier tube 115 corresponding to that level is added to the ramp signal from the potentiometer 106. The ramp signal is increasing to progressively slow down the motor 22. Therefore the added signal from the photomultiplier tube further decreases the speed of the motor 22 while the corresponding area (the high spot) is being scanned. The signals produced by optically scanning areas surrounding the smallest area of the different areas of light transmission produce proportionally lower amplitude signals from the photomultiplier tube, and therefore slow the photomultiplier tube down proportionately less.

I claim:

1. A method of polishing the optical surface of a workpiece to conform to a desired contour within specified tolerances using apparatus for removing material at successive points over the entire optical surface of said workpiece in response to a predetermined and programmed pattern comprising the steps of establishing a time interval during which the rate of material removal from said optical surface does not vary more than a small percentage for current lapping conditions, measuring the deviation of each point of said optical surface from said desired contour, preparing a program for said apparatus to complete one cycle of material removal over all points of said optical surface within a period equal to said interval such that, for each point on said optical surface, the material removed is proportional to said measured deviation from said desired contour, removing material from the entire surface of said workpiece during one cycle of material removal over all points according to said program, repeating said one cycle of material removal over all points according to said program until a significant and measurable amount of material is removed from all points of said optical surface, but only a fraction of said deviation has been corrected, and repeating the entire process until all points of said optical surface conform to said desired contour within said specified tolerance.

2. A method of polishing an optical surface to a desired contour within specified tolerances using apparatus for lapping said surface with a pad using small strokes while scanning all of said surface in a predetermined pattern comprising the steps of establishing a time interval during which the rate of material removal by said lapping strokes can be expected to remain constant within a small percentage for current operating conditions, measuring the deviation of said surface from said desired contour, preparing a program to control lapping of the entire optical surface in one cycle and in a period of time equal to or less than said time interval such that for each point the total time during which said pad is in contact is proportional to said deviation from said contour, lapping said surface under control of said program while scanning all of said surface in one cycle, repeating the step of lapping said surface under control of said program in one scanning cycle until a significant and measurable amount of material is removed from all points of said optical surface, and repeating the entire process until all points of said optical surface conform to said desired contour within said specified tolerance.

3. A method as defined in claim 2 wherein said program is prepared to cover said optical surface along a predetermined scanning pattern at a controlled rate with small lapping strokes at a substantially constant pressure superimposed on the scanning pattern at a controlled rate, and to vary a selected one of said controlled rates as a function of said deviation.

4. A method as defined in claim 3 wherein the rate varied is the rate of said scanning pattern.

* * * * *